(12) United States Patent
Rothschild

(10) Patent No.: US 11,543,201 B2
(45) Date of Patent: *Jan. 3, 2023

(54) FIREARM ANALYTICS DEVICE

(71) Applicant: Leigh M. Rothschild, Miami, FL (US)

(72) Inventor: Leigh M. Rothschild, Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/805,300

(22) Filed: Feb. 28, 2020

(65) Prior Publication Data

US 2022/0057158 A1     Feb. 24, 2022

(51) Int. Cl.
| | |
|---|---|
| *F41A 17/06* | (2006.01) |
| *H04N 5/372* | (2011.01) |
| *H04L 67/12* | (2022.01) |
| *G06V 20/20* | (2022.01) |
| *G06V 40/10* | (2022.01) |
| *G06V 40/12* | (2022.01) |
| *G06V 40/16* | (2022.01) |
| *G06V 40/14* | (2022.01) |

(52) U.S. Cl.
CPC .......... *F41A 17/063* (2013.01); *F41A 17/066* (2013.01); *G06V 20/20* (2022.01); *G06V 40/10* (2022.01); *G06V 40/12* (2022.01); *G06V 40/161* (2022.01); *H04L 67/12* (2013.01); *H04N 5/372* (2013.01); *G06V 40/14* (2022.01)

(58) Field of Classification Search
CPC ..... F41A 17/063; F41A 17/066; G06V 20/20; G06V 40/12; G06V 40/10; G06V 40/161; G06V 40/14; H04L 67/12; H04N 5/372
See application file for complete search history.

(56) References Cited

U.S. PATENT DOCUMENTS

| | | | |
|---|---|---|---|
| 5,426,302 A | 6/1995 | Marchman et al. | |
| 9,752,840 B1 | 9/2017 | Betro | |
| 10,845,142 B2 | 11/2020 | Flood | |
| 2014/0378088 A1* | 12/2014 | Goel | H04W 12/02 455/404.2 |
| 2016/0190859 A1* | 6/2016 | Blum | F41J 5/10 348/372 |
| 2017/0061781 A1* | 3/2017 | Ware | G08B 25/016 |
| 2018/0142977 A1* | 5/2018 | Kloepfer | F41A 17/066 |
| 2019/0376756 A1* | 12/2019 | Nieh | F41A 17/08 |
| 2020/0117900 A1* | 4/2020 | Deng | H04W 4/026 |
| 2020/0124850 A1* | 4/2020 | Smith | G02B 27/017 |

(Continued)

*Primary Examiner* — Dakshesh D Parikh

(57) ABSTRACT

The invention describes a system for or recording the usage of a firearm and helping a user during usage of the firearm using multiple sensors to gather various information. The system includes a plurality of sensors to record various usage and status data of the firearm. The system further includes a communication module communicatively coupled to the sensors. The communication module is further connected to a processor. The system further includes a memory, a clock chip and an information disseminating device that includes a communication port. The plurality of sensors are configured to gather various information about a firearm device that may be a pistol, a revolver, a gun, etc. after being attached to the firearm device. In addition to the operational information, some of the sensors out of the plurality of sensors may gather information about surrounding environment of the firearm like lighting conditions, wind flow etc. to help a user of the firearm device to use it efficiently.

13 Claims, 6 Drawing Sheets

(56) References Cited

U.S. PATENT DOCUMENTS

| | | | |
|---|---|---|---|
| 2020/0355454 A1* | 11/2020 | Deng | G01S 19/18 |
| 2021/0080208 A1* | 3/2021 | Wu | G08B 25/014 |
| 2021/0255627 A1* | 8/2021 | Snyder | G01S 15/89 |
| 2022/0205751 A1 | 6/2022 | Rothschild | |

* cited by examiner

FIREARM ANALYTICS DEVICE

Including pursuant to 37 C.F.R. §§ 1.121 & 1.125, please replace the current specification with the following specification. This amended specification is amended to include paragraph numbers for the specification for formatting purposes, and as such, no new matter has been added.

FIELD OF INVENTION

The present invention relates to a firearm analytics device.

BACKGROUND OF THE INVENTION

In today's world firearms are prevalent in every part of the world. They are also widely used for non-military and military purposes. In both cases there is a need to establish and completely document the usage of a firearm both during handling of the firearm, as well as pre and post firing of the weapon. The information that can be collected and securely stored is vital for analysis for both the individual user and law enforcement as well as legal and societal usage. Storing this information in a secure and encrypted (optional) form is also imperative.

BRIEF DESCRIPTION OF DRAWINGS

The following detailed description of various embodiments is better understood when read in conjunction with the drawings provided herein. For illustrative purposes, exemplary embodiments are shown in the drawings; however, the presently disclosed subject matter is not limited to the specific systems and methods shown in those embodiments

DETAILED DESCRIPTION OF INVENTION

The present invention provides a solution for recording the usage of a firearm and helping a user during usage of the firearm using multiple sensors to gather various information."

Figure 1:
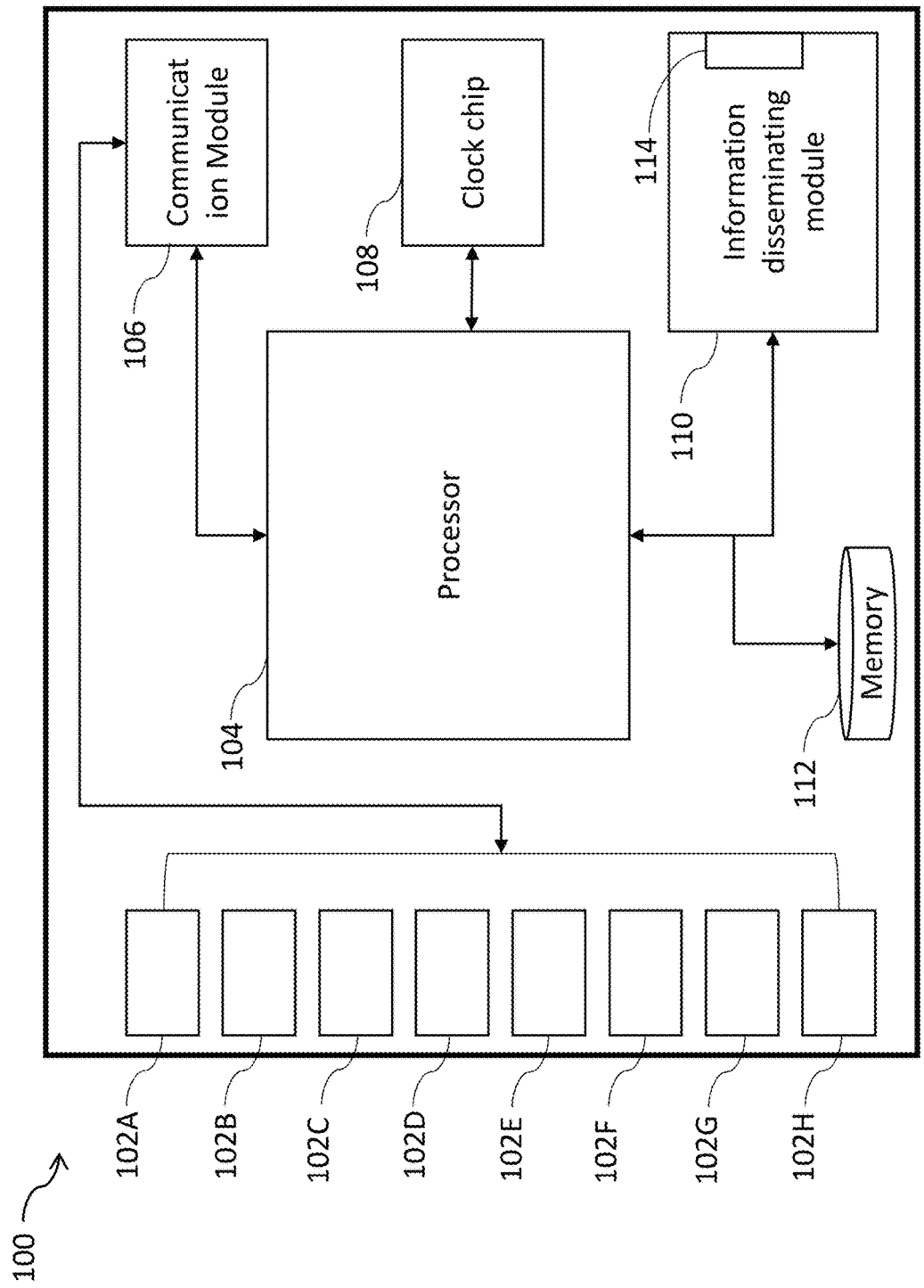
FIG. 1 is a block diagram of a system for firearm analytics, in accordance with an embodiment of the invention.

"Referring to FIG. 1, a block diagram, illustrates a system 100, in accordance with an embodiment of the invention. The system 100 includes a plurality of sensors 102A-102H (herein referred to as sensors 102 from herein after). The system further includes a communication module 106 communicatively coupled to the sensors 102. The communication module 106 is further connected to a processor 104. The system further includes a memory 112, a clock chip 108 and an information disseminating device 110 that includes a communication port 114. It may also be appreciated that the system 100 may also be in the form of an attachment device that may be attached to the firearm. Hence, term system may be used interchangeably with term device.

The plurality of sensors 102 are communicatively coupled to the communication module 106. The communication module 106 is further connected to the processor 104. The processor is also connected to a memory 112, a clock chip 108 and the information disseminating device 110.

According to an embodiment of the invention, the plurality of sensors 102 are configured to gather various information about a firearm device that may be a pistol, a revolver, a gun, etc. after being attached to the firearm device. In addition to the operational information, some of the sensors out of the plurality of sensors 102 may gather information about surrounding environment of the firearm like lighting conditions, wind flow etc. The system 100 may be attached in the form of an add on module to the firearm device. This addon module may be a single item module or several modules that connect with each other to form the complete system.

According to an embodiment of the invention, the plurality of sensors 102 may include target angle calculating sensor to calculate angles of a target, specific location etc. The target angle calculating sensors may be anyone or a combination of a Global positioning system (GPS) sensor, an accelerometer, a gyroscope and a gimbal.

According to yet another embodiment of the invention, the plurality of sensors 102 may include firing determinations sensors configured to determine firing of the firearm device. The firing determination sensors tray include any one or a combination of a smoke detector and a sound detector.

According to yet another embodiment of the invention, the plurality of sensors 102 may include infra-red sensors configured to determine amount of ammunition or bullets in the cartridge of a firearm or within the chamber of the firearm.

According to yet another embodiment of the invention, the plurality of sensors 102 may include at least one imaging sensor that may be a CCD camera. The CCD camera may be a wide angle camera, or a self-focusing camera. The CCD camera may be configured further to determine light conditions around the firearm and propose targeting help to the user of the firearm. Further, the CCD camera may also be configured to determine subjects in target view of the firearm device. Furthermore, the CCD camera may also be configured to determine in case the target being targeted by the user is hit and also a preliminary extent of damage to the target. Also, the CCD camera may be configured to determine in case the target, in case it is a human, is using a weapon and also determine type of the weapon being used by the target.

According to yet another embodiment of the invention, the plurality of sensors 102 may include a bio detector to detect the user of the firearm. In an embodiment, the bio detector may be a DNA detector, a fingerprint detector, a facial recognition detector or a vein pattern detector.

According to yet another embodiment of the invention, the plurality of sensors 102 may include a sensitivity detector that is configured to determine when the trigger of the firearm is accessed or pressed. In an embodiment, the sensitivity detector may be a pressure sensor to detect change in pressure applied to the trigger of the firearm.

The communication module 106 receives operational information gathered by the plurality of sensors 102. The communication module 106, as described earlier, is connected on one side to the plurality of sensors 102 and on the other side it is communicatively coupled to the processor 104. The communication module collects all the operational information from the plurality of sensors and further may transmit the same to the processor 104 or also to a remote server or database (not shown in figures) for storage. In an embodiment of the invention, the communication module 106 may be anyone of a Wi-Fi module, a Bluetooth module, an NFC module, a near NFC module, or an infrared module. Hence, the communication module 106 may be able to communicate the operational information to the remote server or database through wireless communications. The communication module 106 may also be configured to connect wirelessly to other like systems in order to form a closed group of similar systems wherein the information exchanged within this configuration may be in an encrypted format. In a further configuration, the communication module 106 may be configured to be user activated through voice or touch input through a user interface.

The processor 104, amongst other capabilities, may be configured to fetch and execute computer-readable instructions stored in the memory 112. The processor 104 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as ""processor(s)"", may be provided through the use of dedicated hardware as well as hardware capable of executing software in association with appropriate software. The processor 104 receives various operational information from the communication module 106. The processor 104 may also be configured to control the plurality of sensors 102 and their functioning. The processor 104 may also be connected to an input module (not shown in the figure) that may take a user's input for requesting various help options. The input module may be a voice activated chip or a touch screen display. The input module may also be a separate device communicating with the processor 104 through the communication module 106. The processor 104 may provide various information automatically or induced by the user's input queries for example providing better targeting guidance while using the firearm. The processor 104 may be connected to a memory 112 to record various operational information and usage information of the firearm. The processor 104 may record user identification, using the bio detector and the clock chip 108, for usage of the firearm, may also record time of day when the firearm was used including location where it was used through target angle calculating sensors and firing determination sensors. It may also record when safety was switched off, when trigger pressure was applied but, not fired or when it was fired through information gathered by the sensitivity detector. Processor 104 may also record firing time and location of the firing, using target angle calculating sensors, and lighting conditions, using the at least one imaging sensor information, while usage of the firearm. For helping the user using the firearm it tray record the number of bullets within the firearm remaining in the cartridge or used or within the chamber of the firearm through information gathered by the IR sensors.

Furthermore, the processor 104 may also use the information gathered by the firing determination sensors and the target angle calculating sensors to determine and record angle of the firearm pre and post firing. Also, as stated above the lighting conditions around the firearm may also be determined to help the user and record the same using the information gathered by the image sensor that may be a wide angle CCD camera. The processor 104 may also record the target using the image sensor and assess the extent of damage if the user fires the firearm on the target. The processor 104, may also be able to recommend some suggestions to the user of the firearm about weapon of the target. The processor may recommend actions based on the weapon identified of the target and also how and from where the target is firing its weapon. For example, what angle to take for a counter firing etc.

The information disseminating device 110 may be configured to determine and provide an analytics information to the user of the firearm. As, the information disseminating device 110 is communicatively coupled to the processor 104, it can determine the guidance to be provided itself or may relay the information as determined and provided by the processor 104. The information disseminating device 110 may be a display screen like a liquid crystal display (LCD), a light emitting diode (LED) display, etc. or may be a speaker provided to provide an audio output to the user. The information disseminating device 110 may further be configured to make service recommendation to the user of the firearm based on the information gathered by the plurality of sensors 102.

Furthermore, the system 100 or specifically the information disseminating device 110 may be configured to include a communication port 114. The communication port 114 may be provided to attach any other accessory like audio accessory for e.g. headphones or a visual accessory like an augmented reality headset, a helmet with audio and visual capabilities like a heads up display (HUD). The user may be able to communicate to other systems using these accessories connected through the communication port 114 to be described later in the description.

Figure 2:
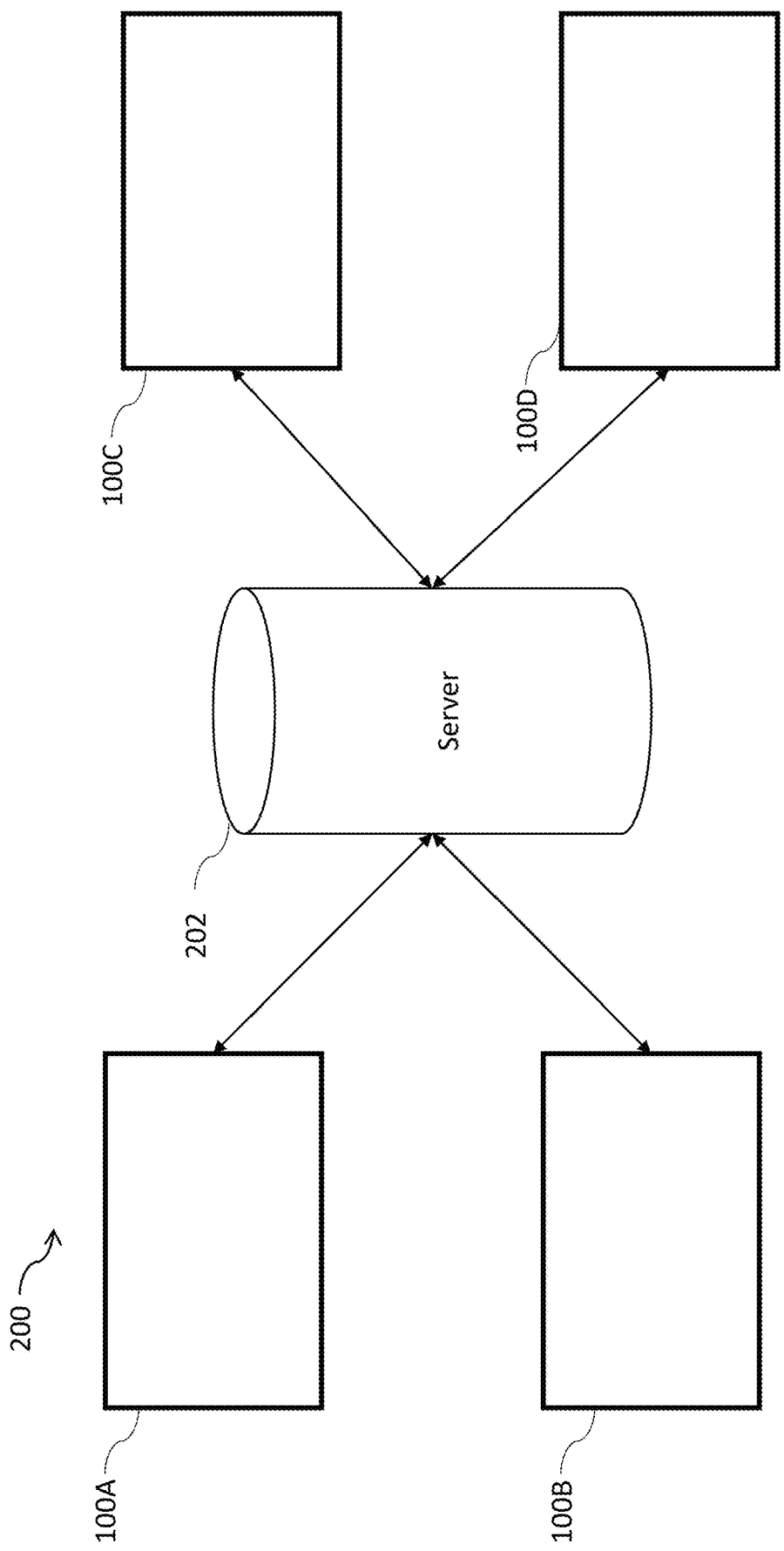
FIG. 2 is a block diagram of a configuration of the system, in accordance with an embodiment of the invention.

Referring now to FIG. 2, illustrating a communication configuration 200 of similar systems 110A-100D, to system 100, in accordance with an embodiment of the invention. In this configuration, the systems 100A-100D are connected to a central server 202 or a cloud server and exchange communication with each other in an encrypted format.

Figure 3:
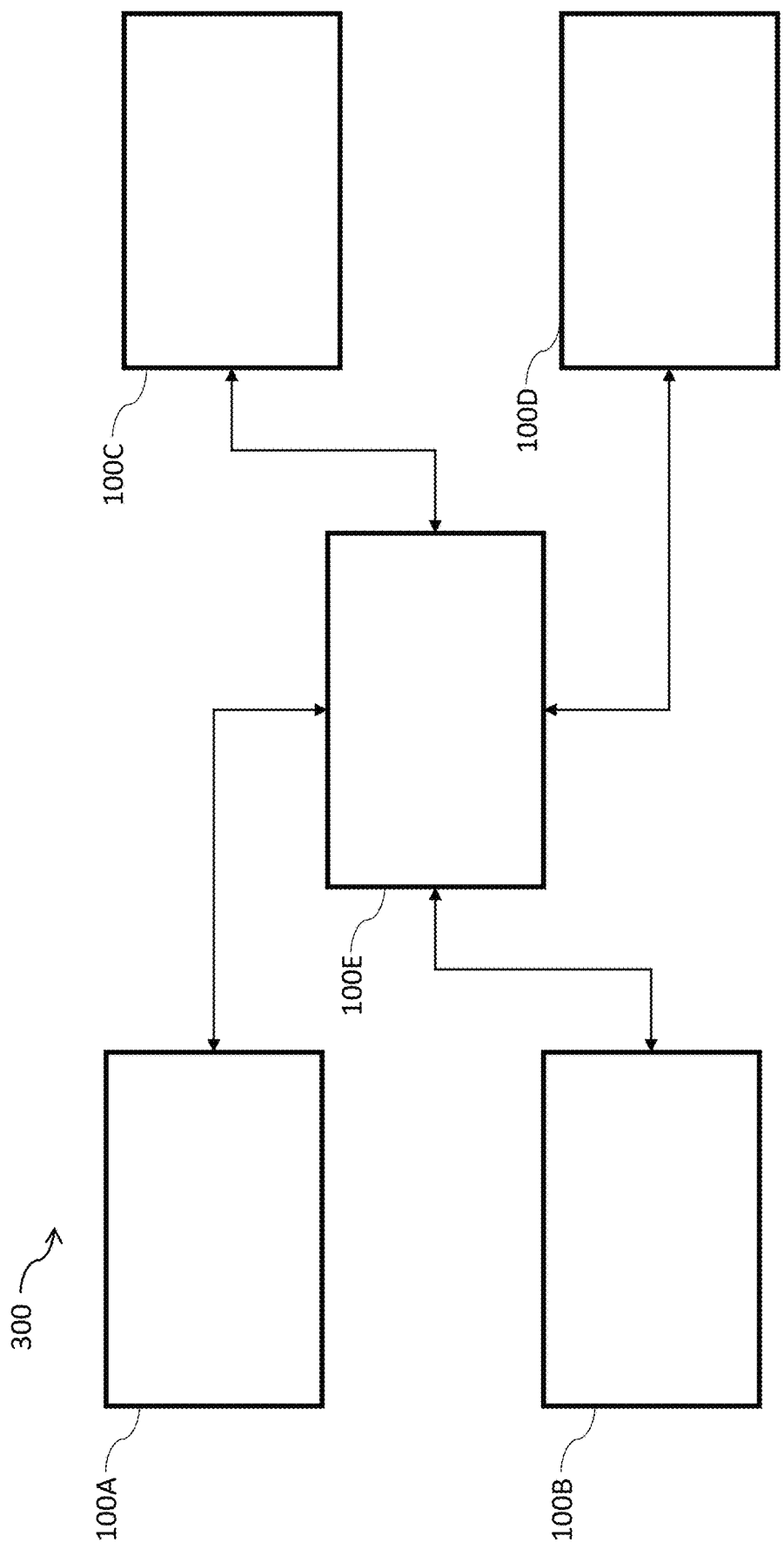
FIG. 3 is a block diagram of another configuration of the system, in accordance with another embodiment of the invention.

Referring now to FIG. 3, illustrating a communication configuration 300 is depicted in accordance with another embodiment of the invention. In a similar way as described above, systems 100A-100E are in communication with each other however, the communication is through a master system 100E as depicted in the diagram itself In this way multiple users may be controlled by the master system 100E through wireless communication and the exchange of information is also controlled by the master system 100E.

Figure 4:
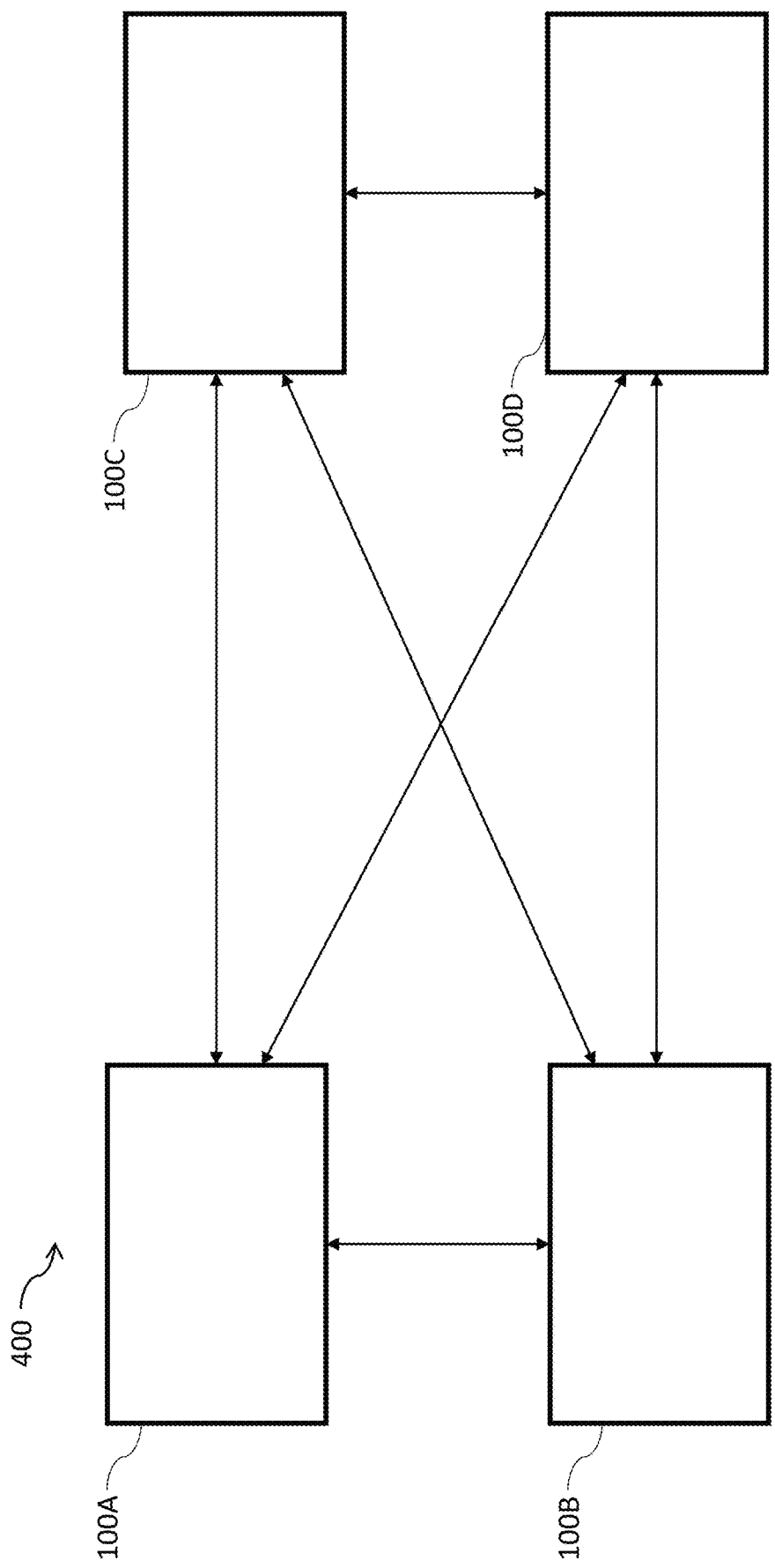
FIG. 4 is a block diagram of another configuration of the system, in accordance with another embodiment of the invention.

Referring now to FIG. 4, communication configuration 400 of systems 100A-100D are shown in accordance with another embodiment of the invention. In this configuration, also knowns as a distributed communication, is achieved. No single system is a master system, but, all can communicate with each other without being dependent on any other or central system. All the systems 100A-100D can communicate with each other independently and without any interruption.

Figure 5:
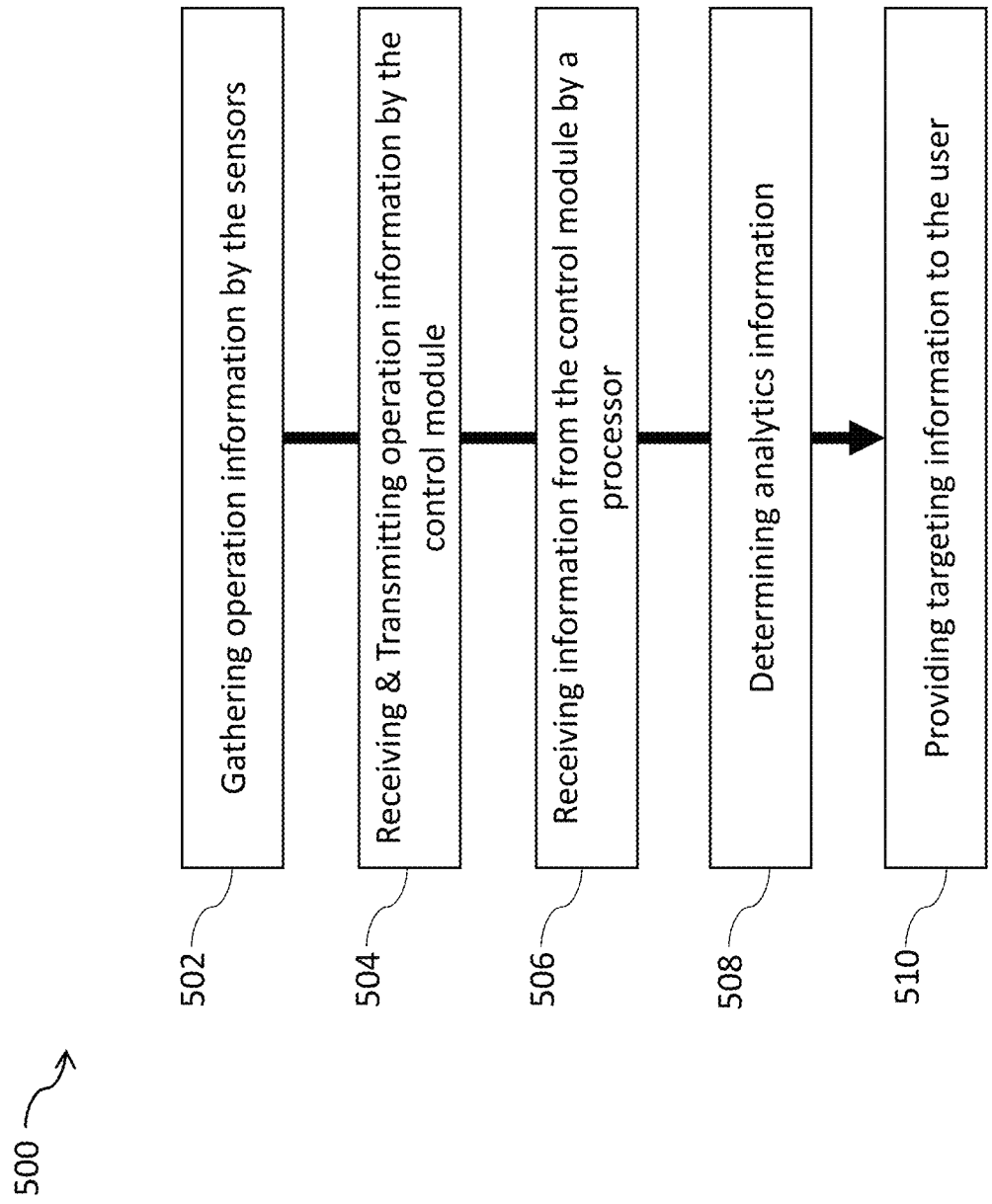
FIG. 5 is a flow chart depicting a method for firearm analytics, in accordance with an embodiment of the invention.

Referring to FIG. 5, illustrating a flow chart depicting a method 500 for performing firearm analytics, in accordance with an embodiment of the invention. The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof: However, for ease of explanation, in the embodiments described below, the method may be considered to be implemented in the above described system and/or the apparatus and/or any electronic device (not shown).

At step 502, the plurality of sensors 102 gather various operational information and surrounding information about and around the firearm like as described above in conjunction with FIG. 1. The gathered operational information and surrounding information may then be received by the control module 106 at step 504. The gathered operational and the surrounding information is then forwarded by the control module, in response to an input by the user into the input module as described earlier. Therefore, at step 506, the operational information and the surrounding information is received by the processor for further analysis based on the user input. For example, the user may want help of the processor 104 for better target calculations so the processor receives information from the communication module 106 gathered from target calculating sensors (information about angle of weapon, height to keep the firearm at etc.) and imaging sensor (information about light etc.). The processor 104 then determines the information to be provided to the user for achieving better targeting parameters like "move left" raise weapon till you hear a beep" etc. at step 508. Further, at step 510, the determined analytics information is provided to the user through the information disseminating device 110. The information disseminating device 110 may be connected to a headset for receiving information or a helmet with HUD (both as described earlier).

Figure 6:
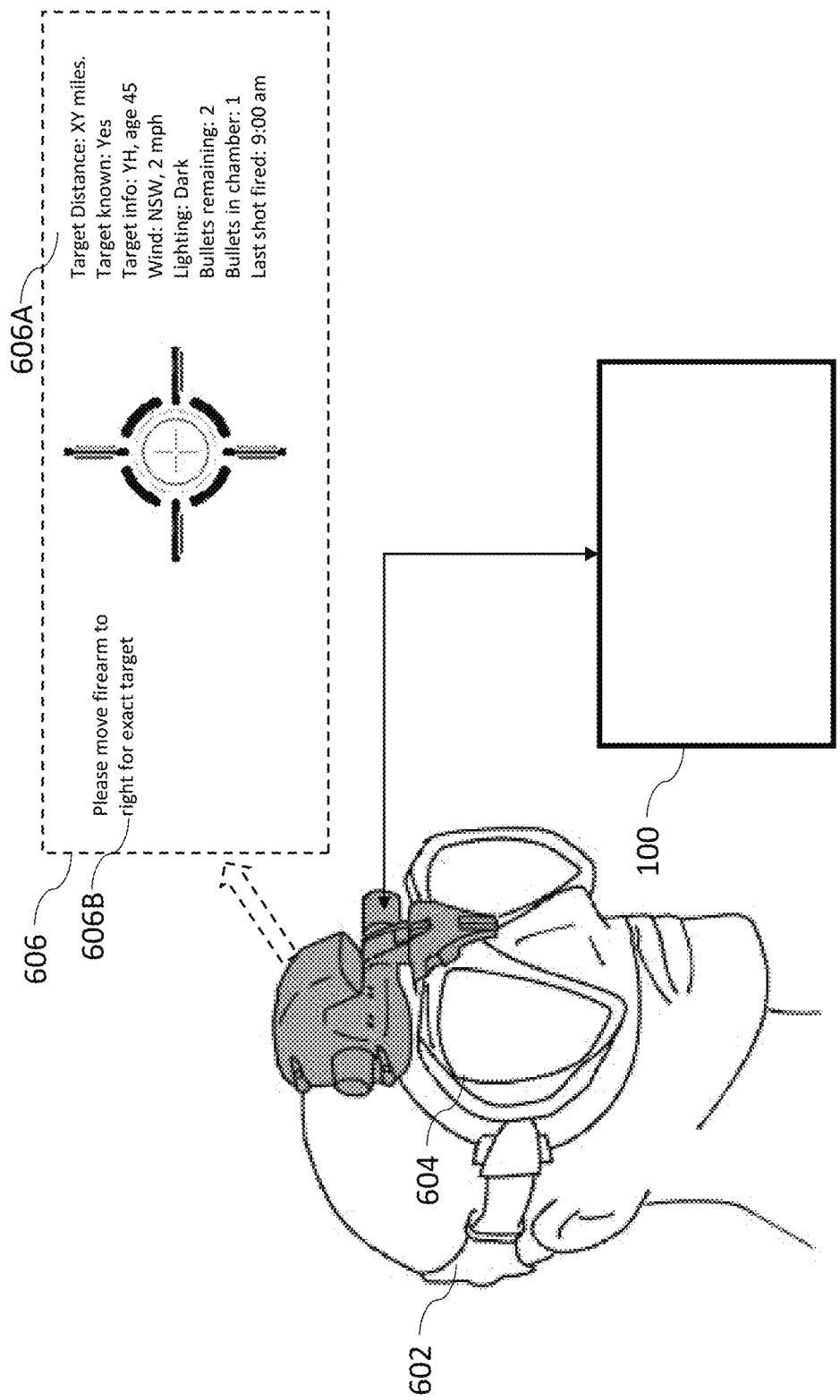
FIG. 6 is a line diagram illustrating usage of the system, in accordance with an embodiment of the invention.

Referring to FIG. 6 illustrating a usage of the system 100 in accordance with an embodiment of the invention. The exemplary embodiment is not to be considered as restrictive and it is to be note that the system 100 may have further usage configurations as apparent to a person having ordinary skill in the art. The system 100, as described earlier may be attached to a helmet 602 worn by the user. The helmet 602 may be an augmented reality helmet configured to display various parameters to the user on a display as depicted by block 604. The display 604 may display analytics information to the user similar to the one, but, not limiting to the scope of the invention, by block 606. The analytics information may be displayed on one side, as in depicted by block 606A to display certain information automatically, information requested by the user or both simultaneously. For example, as shown, the block 606A displays target distance, identity of target (like human, or known human if identity present in remote server, its information, wind speed, lighting conditions, ammunition information, timing of the firearm last used and also date.

Further, to this, there may also be a block 606B, that may provide guidance to the user on how to place the firearm. For example, in the depicted block 606B, the system 100 sends a message to the user "Please move firearm to right for exact target". This will help the user to obtain a better target shot. However, this may not be considered limiting and there may also be certain other information that may be provided to the user for using the firearm.

While certain embodiments have been described, these embodiments have been presented by way of example only, and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure. The accompanying claims and their equivalents are intended to cover such forms or modifications as would fall within the scope and spirit of the present disclosure.

It is to be appreciated that the prior art systems do not take care of the surrounding environment and the information of the weapon to perform analytics department. In prior art, information is provided however, no pro-active systems are present that provide sufficient information to the user of such a system in order to support and guide for the usage of the weapon. Also, multiple sensors provide redundant and accurate information to gather usage and further details that help the law enforcement agencies to capture necessary information about the usage of the weapon for proper maintenance of records and instill responsible weapon usage by their users.

What is claimed is:

1. A firearm analytics device comprising:
a plurality of sensors configured to be attached to the firearm to gather operational information of the firearm and surrounding environment, wherein the plurality of sensors comprise one or more user identification bio detector, one or more fire determination sensor, and one or more target angle calculating sensor, wherein:
the one or more user identification bio detectors comprise a vein pattern sensor, the one or more fire determination sensors comprise a smoke detector sensor and the one or more target angle calculating sensors comprise a gimbal; and
a communication module, configured to transmit and receive the operation information of the firearm;
a processor communicatively coupled to the communication module and the plurality of sensors;
an information disseminating device communicatively coupled to the processor and configured to determine and provide an analytics information to a user of the firearm based on the operational information of the firearm and the surrounding environment; and
a communication port configured for attaching an audio or visual accessory, wherein
the visual accessory is an augmented reality headset with a heads up display (HUD); and
the communication module is further configured to communicate to a peer device, internet, another weapon, or to a remote monitoring station, wherein the communication module is further configured to be user activated via any one of a voice activation or with a touch-based user interface activation.

2. The firearms analytics device of claim 1, wherein the one or more target angle calculating sensors further comprise a Global Positioning system (GPS), an accelerometer, or a gyroscope.

3. The firearms analytics device of claim 1, wherein the plurality of sensors further comprise one or more infrared (IR) sensor configured to determine ammunition within the firearm.

4. The firearms analytics device of claim 3, wherein the determined ammunition within the firearm comprises one or more of
the number of bullets in a cartridge of the firearm; or
the number of bullets in a chamber of the firearm.

5. The firearms analytics device of claim 1, wherein the plurality of sensors further comprise one of more imaging sensor.

6. The firearms analytics device of claim 5, wherein the one or more imaging sensor further comprises one or more charge coupled device (CCD) camera, wherein the CCD camera comprises one or more of a wide angle camera; or a self-focusing camera;

and wherein the CCD camera is further configured to determine information on one or more of lighting conditions around the firearm;

subjects in view of the CCD camera;

if a target of a user was hit;

damage to the target; or the target's weapon;

and provide the information to the user through the information disseminating device.

7. The firearms analytics device of claim 1, wherein the one or more user identification bio detectors further comprise one or more Deoxyribose nucleic acid (DNA) detector.

8. The firearms analytics device of claim 1, wherein the one or more user identification bio detectors further comprise one or more fingerprint detector.

9. The firearms analytics device of claim 1, wherein the one or more user identification bio detectors further comprise one or more facial recognition detector.

10. The firearms analytics device of claim 1, wherein the plurality of sensors further comprise one or more sensitivity detector configured to determine when a trigger is accessed.

11. The firearms analytics device of claim 10, wherein the one or more sensitivity detectors further comprise one or more pressure sensor.

12. The firearms analytics device of claim 1, wherein the information disseminating device makes service recommendation to the user.

13. The firearms analytics device of claim 1, wherein the communication module is any one or a combination of a Wi-Fi module, a Bluetooth module, a Near-field communication (NFC) module, a near-NFC module, or an infrared module.

* * * * *